US010696533B2

(12) United States Patent
Dalton et al.

(10) Patent No.: US 10,696,533 B2
(45) Date of Patent: Jun. 30, 2020

(54) REMOTE REGULATOR PRESSURE ADJUSTMENT TOOL AND METHOD USING SAME

(71) Applicant: Legacy US LLC, Menlo Park, CA (US)

(72) Inventors: Jeffrey Travis Dalton, Menlo Park, CA (US); Joseph K. McCarthy, Glenview, IL (US); Carey Costle, Glenview, IL (US)

(73) Assignee: Legacy US, Inc., Boise, ID (US)

( * ) Notice: Subject to any disclaimer, the term of this patent is extended or adjusted under 35 U.S.C. 154(b) by 0 days.

(21) Appl. No.: 15/488,319

(22) Filed: Apr. 14, 2017

(65) Prior Publication Data

US 2017/0260037 A1 Sep. 14, 2017

Related U.S. Application Data

(63) Continuation-in-part of application No. 14/990,673, filed on Jan. 7, 2016, now Pat. No. 9,828,227.

(60) Provisional application No. 62/101,257, filed on Jan. 8, 2015.

(51) Int. Cl.
| B67D 1/12 | (2006.01) |
| B67D 1/04 | (2006.01) |
| B67D 1/08 | (2006.01) |
| G05D 16/10 | (2006.01) |
| F17C 13/00 | (2006.01) |
| B67D 1/14 | (2006.01) |

(52) U.S. Cl.
CPC ............ *B67D 1/1252* (2013.01); *B67D 1/04* (2013.01); *B67D 1/0829* (2013.01); *B67D 1/0835* (2013.01); *B67D 1/0851* (2013.01); *B67D 1/14* (2013.01); *F17C 13/00* (2013.01); *G05D 16/106* (2013.01); *B67D 2001/0824* (2013.01)

(58) Field of Classification Search
CPC ...... B67D 1/1252; B67D 1/04; B67D 1/0829; B67D 1/0835; B67D 1/0851; B67D 1/14; F17C 13/00; G05D 16/106; Y10T 137/612
See application file for complete search history.

(56) References Cited

U.S. PATENT DOCUMENTS

| 746,755 | A | 12/1903 | Spencer |
| 879,604 | A | 2/1908 | Wawrzinski |
| 2,020,492 | A | 11/1935 | Zahm |
| 3,129,730 | A | 4/1964 | Simon |

(Continued)

FOREIGN PATENT DOCUMENTS

| BE | 885849 A2 | 2/1981 |
| CN | 1036627 A | 10/1989 |

(Continued)

OTHER PUBLICATIONS

International Search Report and Written Opinion issued in related International Application No. PCT/US2018/027169, dated Aug. 24, 2018, 2018, 19 pages.

(Continued)

*Primary Examiner* — Kevin R Barss

(57) ABSTRACT

A remote regulator adjustment tool that can be used to adjust an output pressure of a remote regulator. The remote regulator adjustment tool comprises a housing defining a first bore extending therethrough, an adjustor piston movably disposed within the first bore, and an adjustment knob attached to the adjustor piston.

6 Claims, 21 Drawing Sheets

(56) References Cited

U.S. PATENT DOCUMENTS

| | | | |
|---|---|---|---|
| 3,200,994 | A | 8/1965 | Levinson |
| 3,698,417 | A | 10/1972 | Smith |
| 3,933,282 | A | 1/1976 | Stevens |
| 4,011,971 | A | 3/1977 | Haydon |
| 4,364,493 | A | 12/1982 | Raynes |
| 4,484,695 | A | 11/1984 | Fallon et al. |
| 4,898,205 | A | 2/1990 | Ross |
| 4,928,850 | A | 5/1990 | Fallon |
| 5,244,118 | A | 9/1993 | Fallon |
| 5,513,831 | A * | 5/1996 | Seward ................ F16K 35/027 192/95 |
| 5,836,483 | A | 11/1998 | Disel |
| 6,637,516 | B1 * | 10/2003 | Boyd ..................... E21B 29/04 166/379 |
| 6,874,521 | B1 | 4/2005 | Amidzich |
| 7,836,911 | B2 | 11/2010 | Arnott |
| 2006/0011664 | A1 | 1/2006 | Hammond |
| 2009/0194564 | A1 | 8/2009 | Tsubouchi et al. |

FOREIGN PATENT DOCUMENTS

| | | |
|---|---|---|
| CN | 1239464 A | 12/1999 |
| EP | 2720105 A2 | 4/2014 |
| EP | 2720105 B1 | 12/2019 |
| GB | 10858 A | 7/1915 |
| GB | 2094939 | 9/1982 |
| GB | 2094939 A | 9/1982 |
| WO | 2010124036 | 10/2010 |
| WO | 2010124036 A1 | 10/2010 |
| WO | 2013006655 A1 | 10/2013 |
| WO | 2016112323 A1 | 7/2016 |

OTHER PUBLICATIONS

Partial International Search issued in related International Application No. PCT/US2018/027169, dated Jun. 29, 2018, 2 pages.
IPRP PCT/US2018/027169.
Office Action, application 201880004830.8; dated Nov. 7, 2019.
European Search Report 19208212.1.
Office Action, dated Apr. 2020, AU2018251812.

* cited by examiner

REMOTE REGULATOR PRESSURE ADJUSTMENT TOOL AND METHOD USING SAME

CROSS REFERENCE TO RELATED APPLICATIONS

This application is a continuation-in-part of the U.S. Non-Provisional patent application having Ser. No. 14/990,673, filed Jan. 7, 2016, titled "Keg Coupler with Secondary Pressure Regulator and Systems Using Same," which claims priority from a U.S. Provisional Patent Application having Ser. No. 62/101,257, filed Jan. 8, 2015. Each of the referenced applications is hereby incorporated herein by reference.

TECHNOLOGY FIELD

Applicants' disclosure relates to an apparatus for testing and adjusting a remote pressure regulator disclosed in the U.S. Non-Provisional patent application Ser. No. 14/990,673 and a method to utilize that apparatus.

BACKGROUND

When handled properly from brewery to bar to glass, draught beer delivers what many consider to be the freshest, most flavorful beer available to the customer. But the job does not end once the keg is tapped and the beer begins to flow. Good beer quality depends on proper setting of a pour pressure, i.e. the pressure extant within the beer keg itself.

Using prior art assemblies, a plurality of beer kegs receive pressurized $CO_2$ gas from a single, high pressure source. A source regulator is often interconnected to the output end of the $CO_2$ source, wherein that source regulator reduces the source pressure from hundreds/thousands of psi to a line pressure of about 35-50 psi. That same line pressure is utilized to dispense a plurality of differing beers from a corresponding plurality of individual beer kegs.

SUMMARY

The current disclosure is directed to a remote regulator adjustment tool that can be used to adjust an output pressure of a remote pressure regulator. In certain embodiments, that remote regulator is removeably attached to a keg coupler. In certain embodiments, the remote regulator pressure adjustment tool comprises a housing formed to include a first bore extending therethrough, an adjustor piston movably disposed within the first bore, and an adjustment knob interconnected to the adjustor piston. Further, the adjustor piston contains a threaded aperture extending inwardly from a proximal end thereof A plurality of alignments keys are disposed on a distal end of the adjustor piston. In addition, the adjustment knob is attached to a threaded shaft extending outwardly from the adjustor piston, wherein the threading on the threaded shaft mates with the threading form in the threaded aperture. When the adjustment knob is rotated in a first direction, the adjustor piston moves downwardly in the bore. When the adjustment knob is rotated in a second, and opposite direction, the adjustor piston moves upwardly in the bore.

In certain embodiments, the remote regulator comprises an adjustor cap in contact with a spring. When that spring is compressed, the output pressure of an attached regulator increases. When the spring is elongated, the output pressure of an attached regulator decreases.

The adjustor cap is formed to include a plurality of key slots, wherein the alignment keys on the adjuster piston releaseably insert into those key slots formed in the adjuster cap. When the adjustment knob disposed in the pressure adjustment tool is rotated in a first direction, an adjustment spring in the remote regulator is compressed, and the output pressure of the remote regulator increases. When the adjustment knob disposed in the pressure adjustment tool is rotated in a second and opposite direction, an adjustment spring in the remote regulator is elongated, and the output pressure of the remote regulator decreases.

In certain embodiments, the remote regulator adjustment tool comprises a pressure gauge. The pressure gauge is in fluid communication with the first bore. Therefore, the pressure gauge can measure the dispense pressure of a remote regulator. For purposes of this application, the output pressure of the remote regulator may be referred to as a "dispense pressure" and/or a "pour pressure."

Further, in certain embodiments, the remote regulator adjustment tool comprises a pressure release assembly, which includes a second housing formed to include a threaded end and a second bore extending therethrough, a spring disposed within the second bore, a gasket disposed over a distal end of the second bore, a push rod extending through said gasket and in physical contact with the spring, and a button attached to a distal end of the push rod. This pressure release assembly maintains pressure within the adjustment tool when the button is disposed in a first position, and releases pressure from the adjustment tool when the button is disposed in a second position.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Applicants' disclosure is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As a general matter, $CO_2$ gas is supplied in a variety of cylinder sizes ranging from about 30 pounds to about 150 pounds and containing about 10 to about 60 pounds of gas, respectively. The pressure in such cylinders ranges from about 750 PSIG at 72 F to about 1800 PSIG at about 122 F. A source regulator attached to the $CO_2$ cylinder reduces the output pressure to an intermediate pressure of about 20 PSIG to about 35 PSIG. Applicants' remote regulator described herein receives $CO_2$ gas having a pressure of about 20-35 PSIG from a primary regulator, and reduces that pressure to about 5-18 PSIG. Individual dispense pressures are recommended for various brands/types of draught beer plus altitude, temperature, and system length require additional push pressure.

Figure 8:
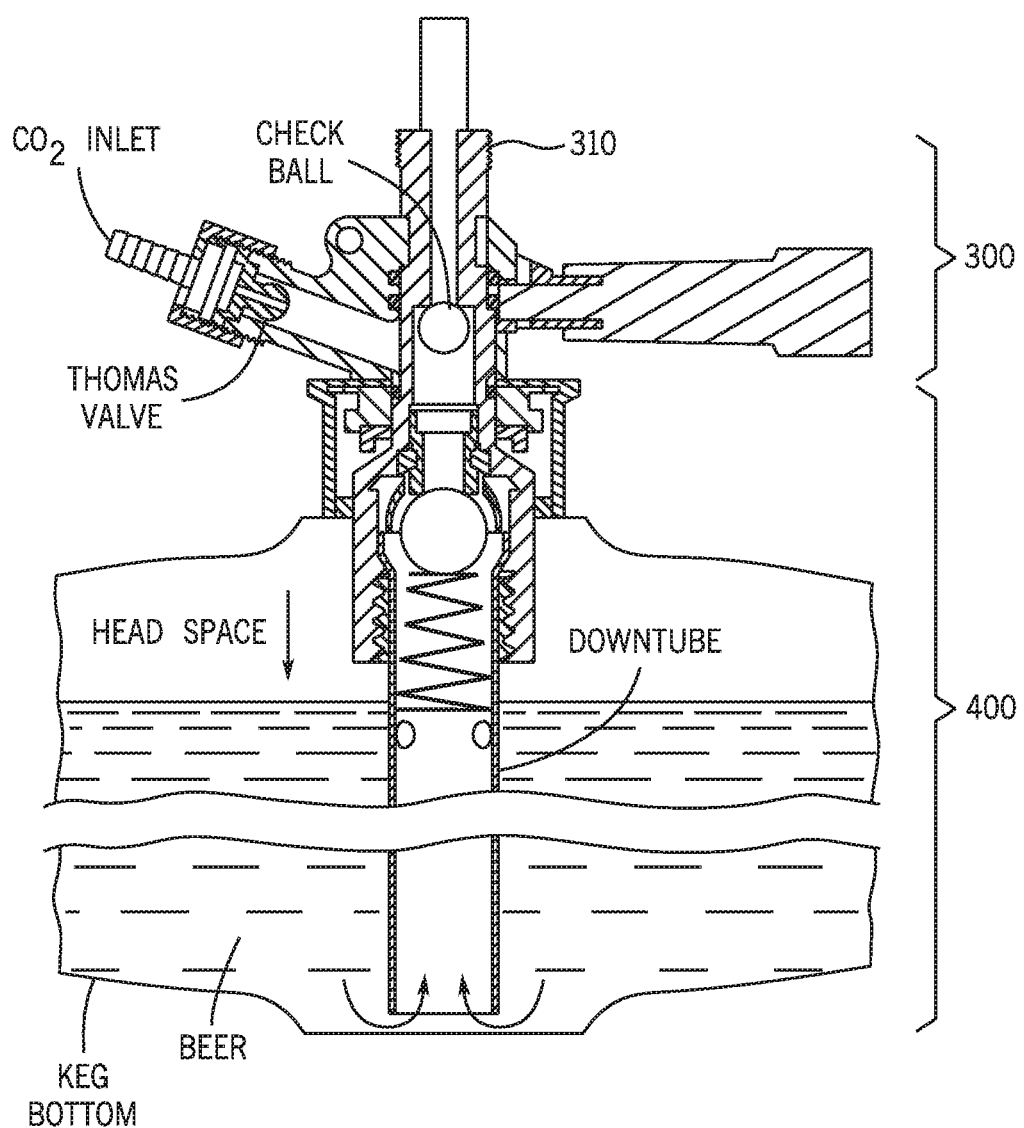
FIG. 8 illustrates keg coupler 300 releaseably attached to a beer keg 400.

Referring now to FIG. 8, gas flows in and beer flows out of a keg through a coupler 300. While this device has many casual names in beer cellars around the country, the industry adopted the term "coupler" as the standard term for the device.

Figure 6:
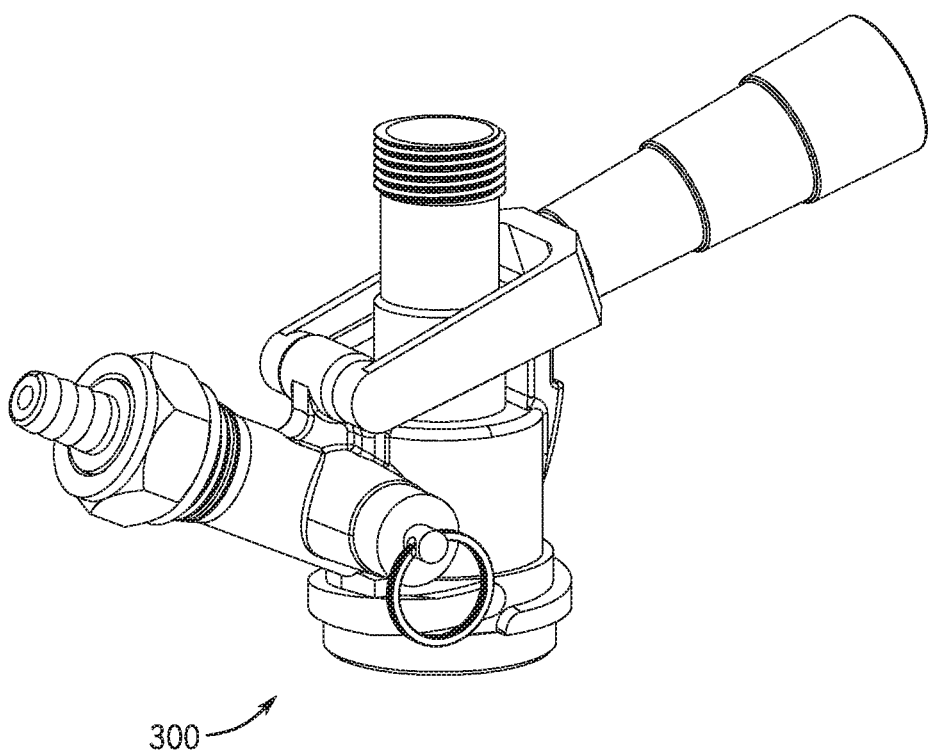
FIG. 6 illustrates a prior art keg coupler 300.
Figure 7:
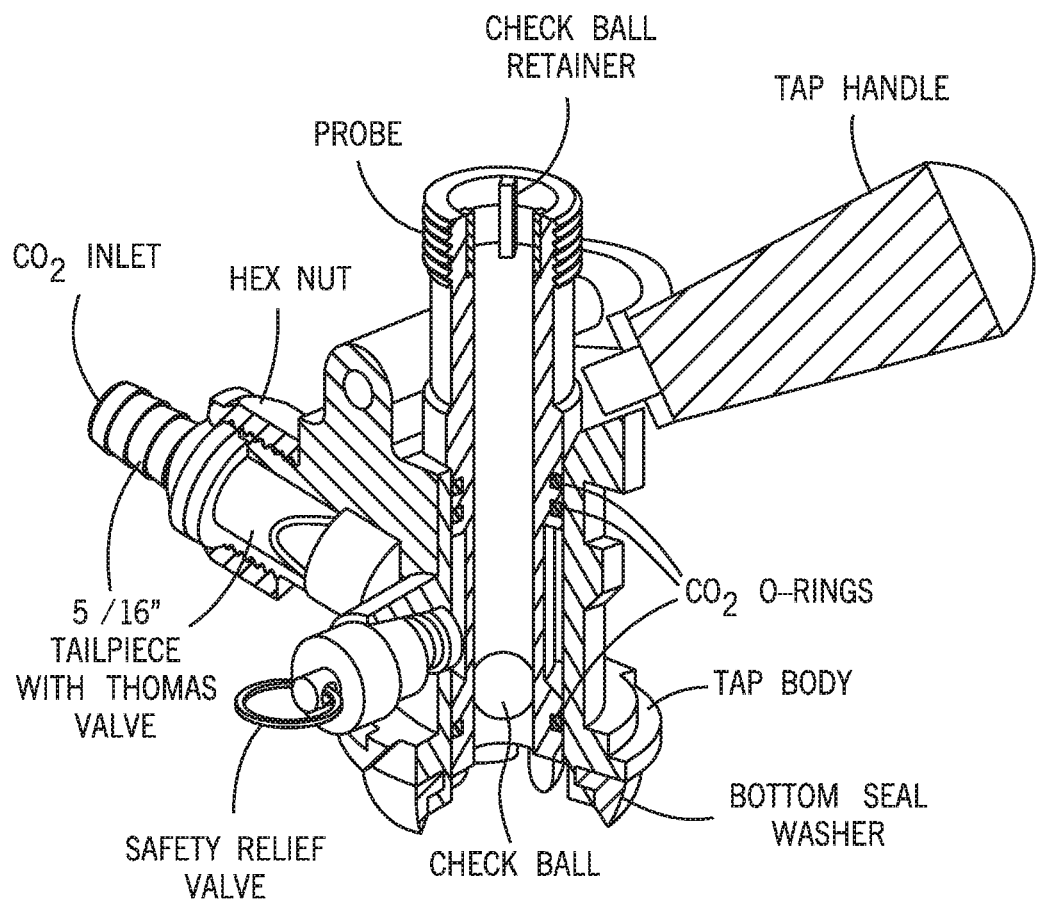
FIG. 7 illustrates the components comprising keg coupler 300.

Most U.S. breweries use a Sankey "D" coupler. FIG. 6 illustrates a Sankey "D" coupler. FIG. 7 illustrates a cutaway view of a Sankey "D" coupler thereby illustrating the components therein. FIG. 8 illustrates a Sankey "D" coupler releaseably mounted on a beer keg.

Kegs are pressurized vessels. Nearly all modern kegs use some form of Sankey valve and stem. There are two main types of Sankey valves and corresponding keg necks: "drop-in," and threaded. Drop-in Sankey valves are held in place by a lock ring or circlip. The lock ring and valve should never be removed in the field. Very rarely a lock ring can fail, possibly loosening the valve, creating a potentially dangerous situation. Threaded Sankey valves screw into the neck of the keg.

When a coupler is attached to a keg to tap it, a probe on the bottom depresses a ball or poppet in the key valve, allowing $CO_2$ or mixed gas to enter the keg thereby applying pressure to the beer. This forces the beer to travel up the down tube (spear) and drive the beer to the faucet. The coupler is attached to a jumper or a beer line 310 (FIG. 8).

Couplers include one of two types of one-way valves, namely a Thomas valve and/or a check valve. A Thomas valve allows $CO_2$ to flow into the keg but prevents the beer from backing up into the gas line if gas pressure drops. This protects the gas regulators from damage. When the coupler is disconnected from the keg, a check valve prevents beer from the beer line flowing out through the coupler. This prevents beer spillage in keg tapping areas.

In certain embodiments, keg coupler 300 further comprises an integral pressure relief valve. If excessive gas pressure were applied to a keg, this valve would open to prevent damage to the keg and coupler. The valve can also be opened manually, and this should be done periodically to test the safety relief valve. The manual release usually looks like a small metal pin fitted with a wire ring. To test the valve, pull on the ring to slide the pin a short distance out of the coupler and release a small amount of gas.

Figure 9A:
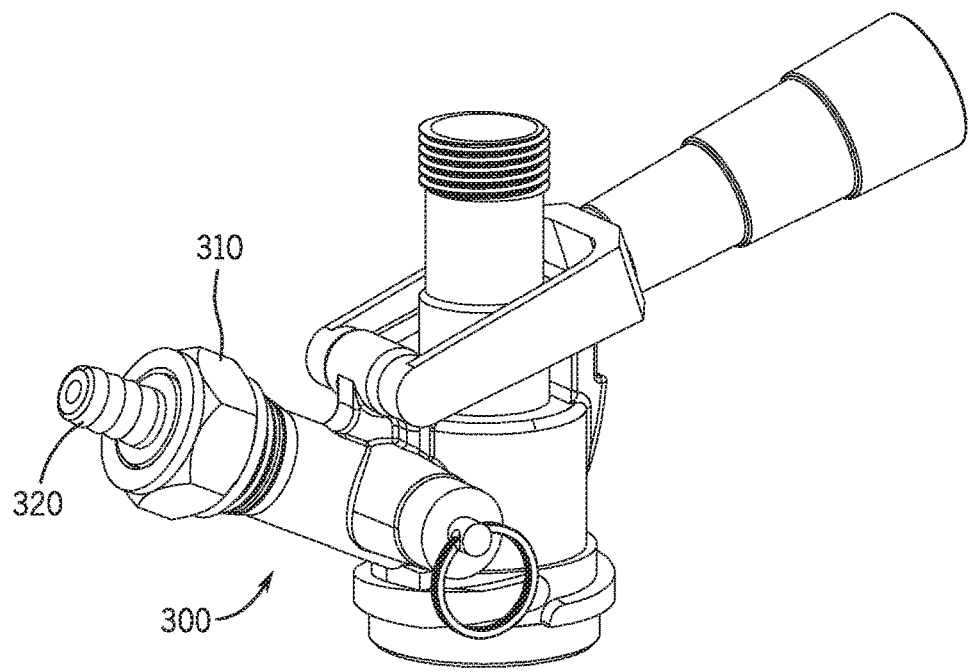
FIG. 9A illustrates a hex nut and tail piece components of keg coupler 300.
Figure 9B:
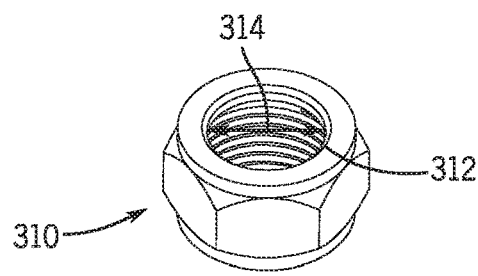
FIG. 9B illustrates hex nut 310 separately.

FIG. 9A illustrates Sankey "D" coupler 300 comprising a tail piece 320 and a hex nut 310. FIG. 9B illustrates hex nut 310. Hex nut 310 is formed to include a threaded aperture 316 extending therethrough. Hex nut 310 further comprises an annular lip 312 extending inwardly into threaded aperture 316. The hex nut aperture comprises a diameter 314 at the annular lips 312.

Figure 9C:
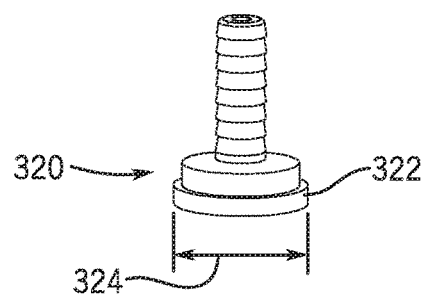
FIG. 9C illustrates tail piece 320 separately.

FIG. 9C illustrates tail piece 320. Tail piece 320 comprises an annular base 322. Annular base comprises a diameter 324. Diameter 324 is greater an diameter 314 of annular lip 312 on hex nut 310 (FIG. 9B).

Figure 4A:
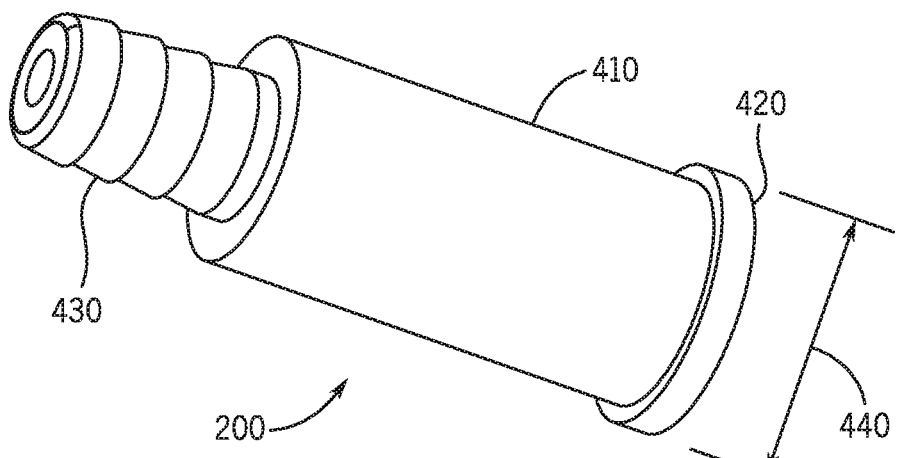
FIG. 4A illustrates one embodiment of Applicants' remote regulator 200.

FIG. 4A illustrates one embodiment of Applicants' remote regulator 200. In the illustrated embodiment of FIG. 4, remote regulator 200 comprises a cylindrical body 410 and an integral tail piece 430.

In the illustrated embodiment of FIG. 4A, Applicants' remote regulator 200 further comprises an annular lip 420 on a proximal end and an integral tail piece 430 on a distal end. In certain embodiments, annular lip 420 comprises a diameter 440, wherein diameter 440 is greater than diameter 314 of annular lip 312 on hex nut 310 (FIG. 9B).

Figure 10:
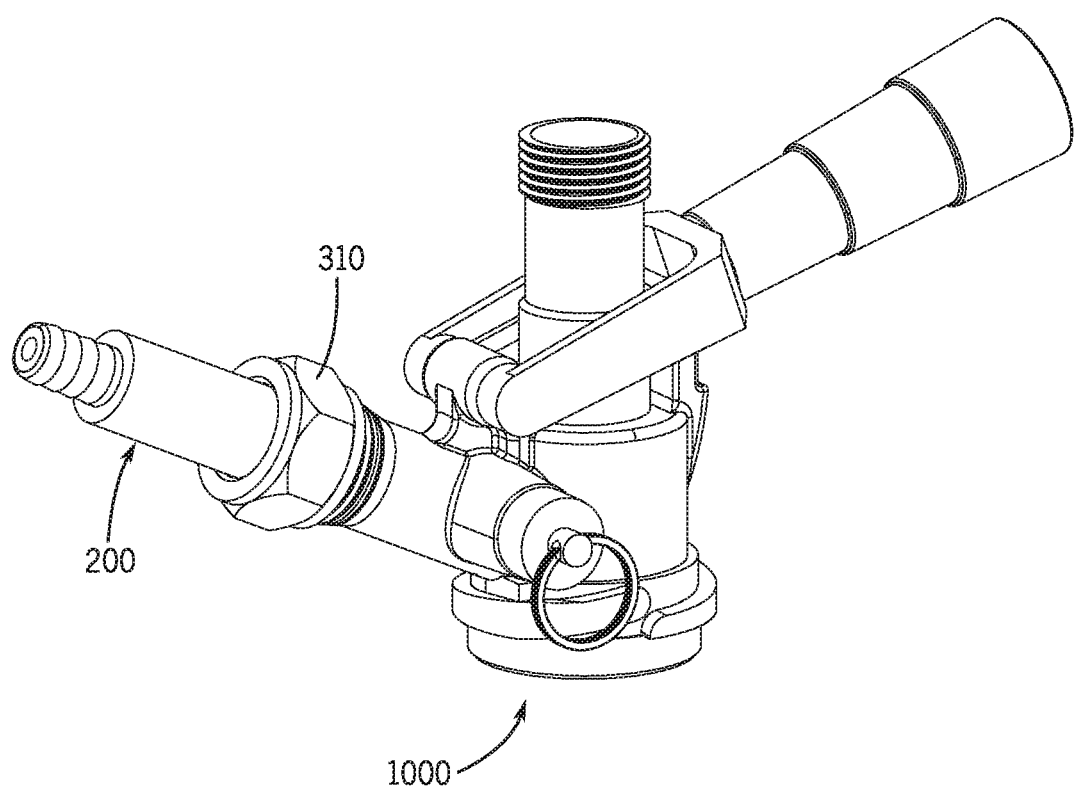
FIG. 10 illustrates Applicants' keg coupler 1000.

FIG. 10 illustrates Applicants' keg coupler 1000 which includes Applicants' remote regulator 200 releaseably attached to Sankey "D" keg coupler. Referring now to FIGS. 4A, 4B, 9A, 9B, 9C, and 10, hex nut 310 is removed from prior art Sankey keg coupler 300, and tail piece 320 is removed from hex nut 310. The distal end of Applicants' remote regulator is inserted into and through hex nut 310 until annular lip 420 is in contact with annular lip 312. Hex nut 310 is then releaseably attached to Sankey keg coupler 300 to give Applicants' keg coupler 1000 (FIG. 10).

Figure 4B:
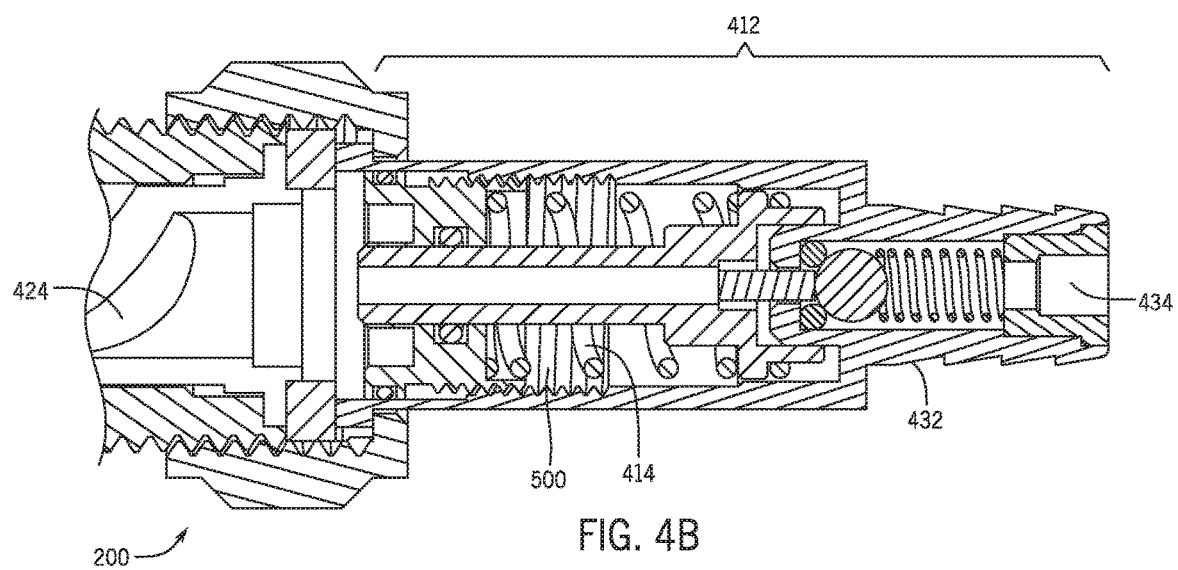
FIG. 4B is a cross-sectional view illustrating components comprising Applicants' remote regulator 200.

FIG. 4B illustrates one embodiment of Applicants' remote regulator 200. Regulator 200 comprises distal portion 412 which includes integral tail piece 432. Distal portion 412 comprises an input section for Applicants' remote regulator 200. Portion 434 comprises a high pressure area in regulator 200.

Compression spring 414 determines the regulated output pressure in portion 424. This regulated output pressure corresponds to the "pour pressure" set for that remote regulator. When spring 414 is compressed, the regulated output pressure in portion 424 increases; when compression spring 414 is elongated, the regulated output pressure in portion 424 decreases.

Figure 1A:
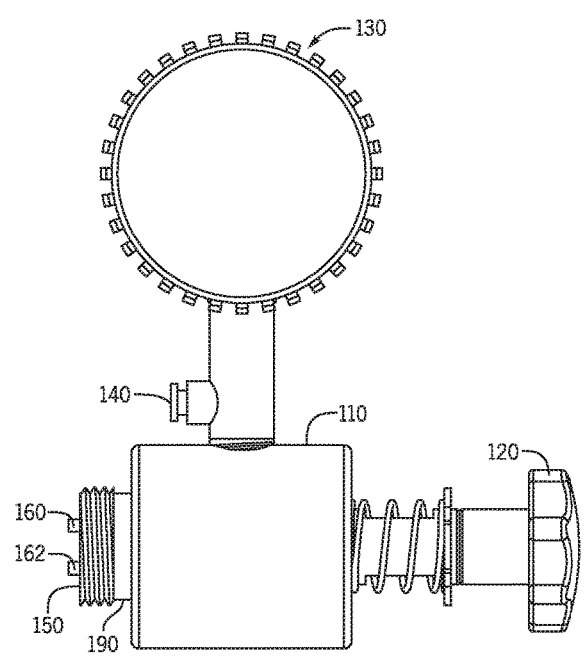
FIG. 1A illustrates a side view of a remote regulator adjustment tool 100.
Figure 1B:
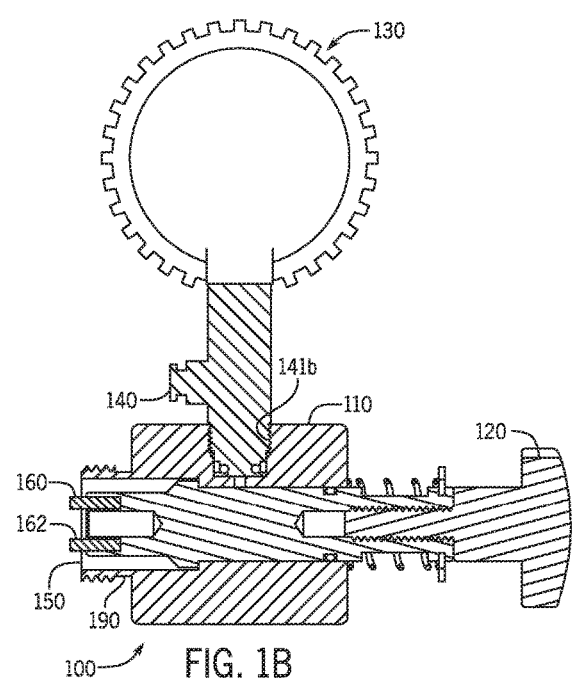
FIG. 1B is a cross-sectional view illustrating components comprising the remote regulator adjustment tool 100 in FIG. 1A.
Figure 2A:
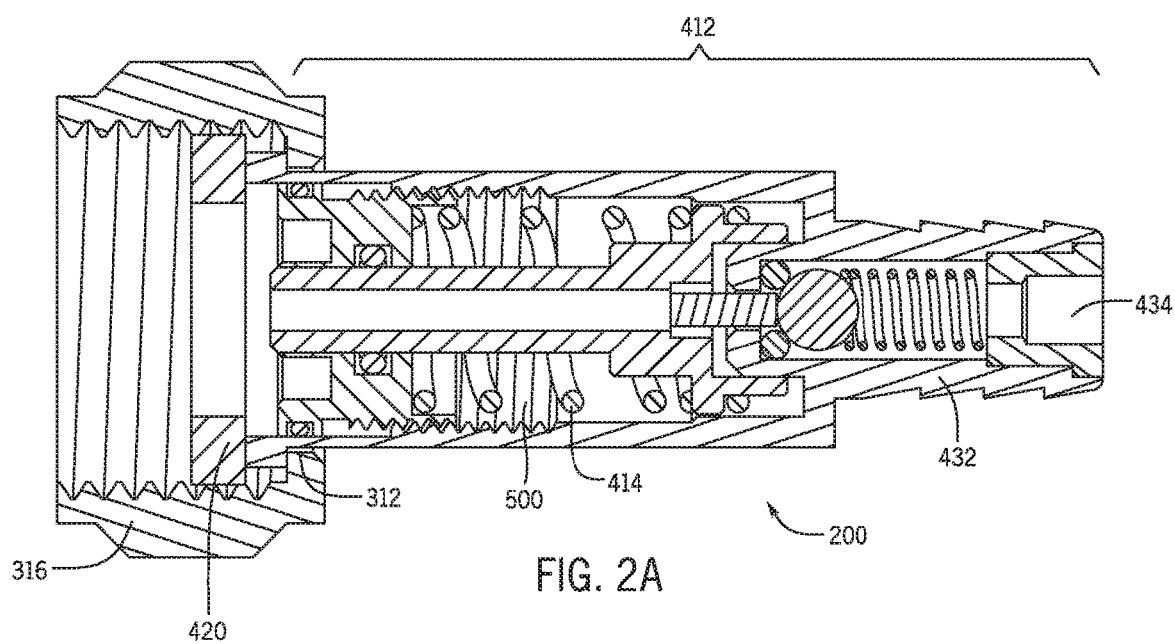
FIG. 2A shows a remote regulator 200 in combination with a hex nut 310.
Figure 2B:
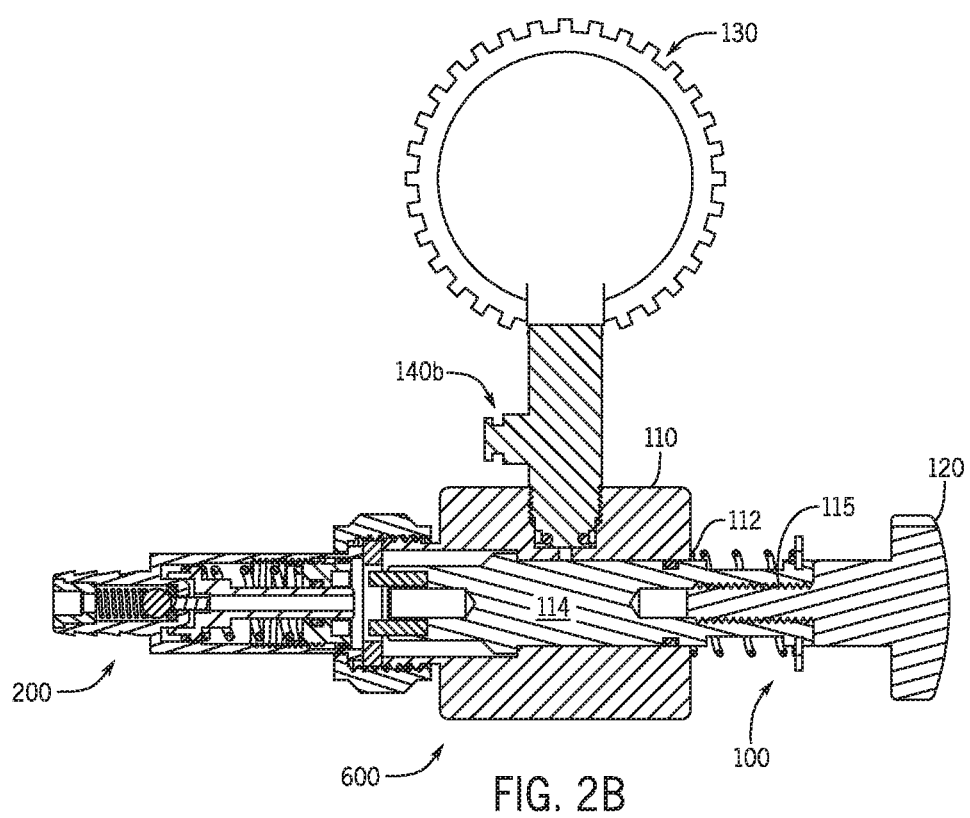
FIG. 2B is a cross-sectional view illustrating components comprising the remote regulator adjustment tool 100 and a remote regulator 200.

FIGS. 1A, 1B, 3A, and 3B illustrate embodiments of Applicants remote regulator adjustment tool 100, which is used to test and adjust the pour pressure of remote regulator 200. FIG. 2B illustrates assembly 600 which comprises Applicants' remote regulator 200 releaseably attached to Applicants' remote regulator adjustment tool 100.

The remote regulator adjustment tool 100 comprises an adjustor piston 114, a housing 110, the adjustor piston 114 moveably disposed within the housing 110, a pressure relief assembly 140, and a pressure gauge 130. Additionally, a distal end 190 (FIGS. 1A and 1B) of housing 110 comprises a threaded connector 150 (FIGS. 1A and 1B) to attach to Applicants' remote regulator. To ensure an air-tight attachment between the remote regulator adjustment tool and the remote regulator, a gasket 180 (FIGS. 2C and 3A) is disposed at distal end 190 of the housing.

FIG. 2B illustrates remote regulator adjustment tool 100 releaseably attached to Applicants' remote regulator 200. Hex nut 310 (FIGS. 2A, 9B) is used to attach remote regulator 200 to remote regulator adjustment tool 100. Referring now to FIGS. 2A, 2B, and 9B, distal end of Applicants' remote regulator 200 is inserted into and through hex nut 310 until annular lip 420 is in contact with annular lip 312. Hex nut 310 is then releaseably attached to threading 150 formed on distal end 190 of remote regulator adjustment tool 100, such that threaded portion 150 of Applicants' remote regulator adjustment tool 100 meshes with the threaded aperture 316 (FIG. 9B) defining the aperture extending through hex nut 310.

Figure 3A:
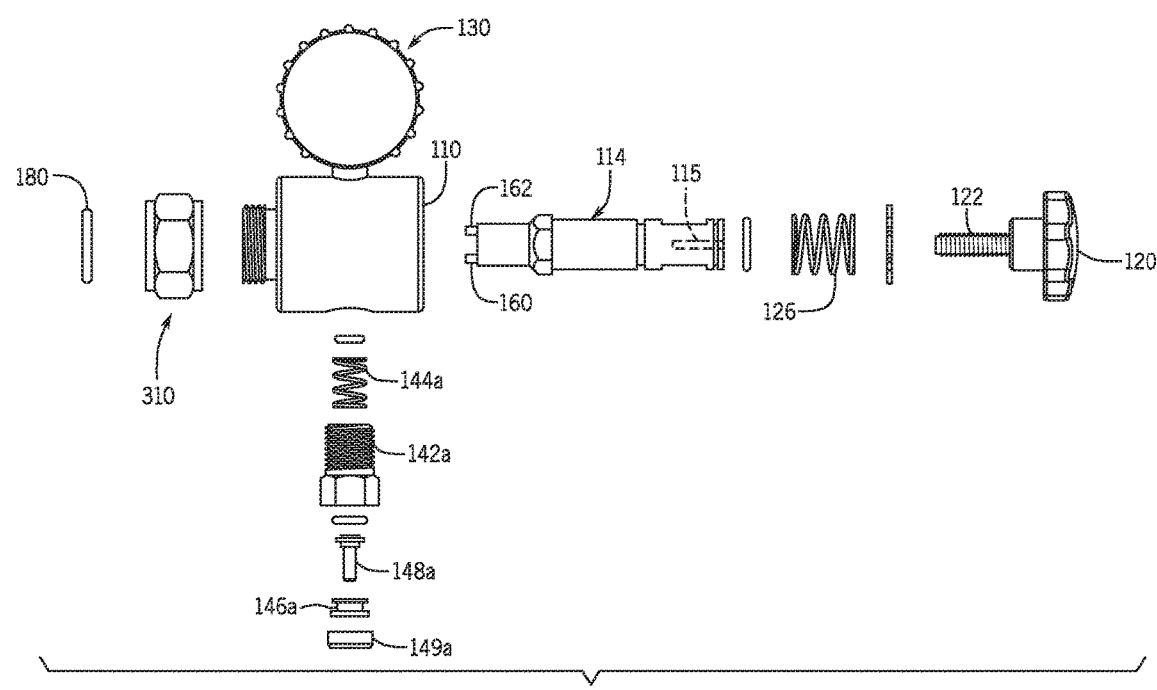
FIG. 3A is an exploded view of one embodiment of the remote regulator adjustment tool 100.
Figure 3B:
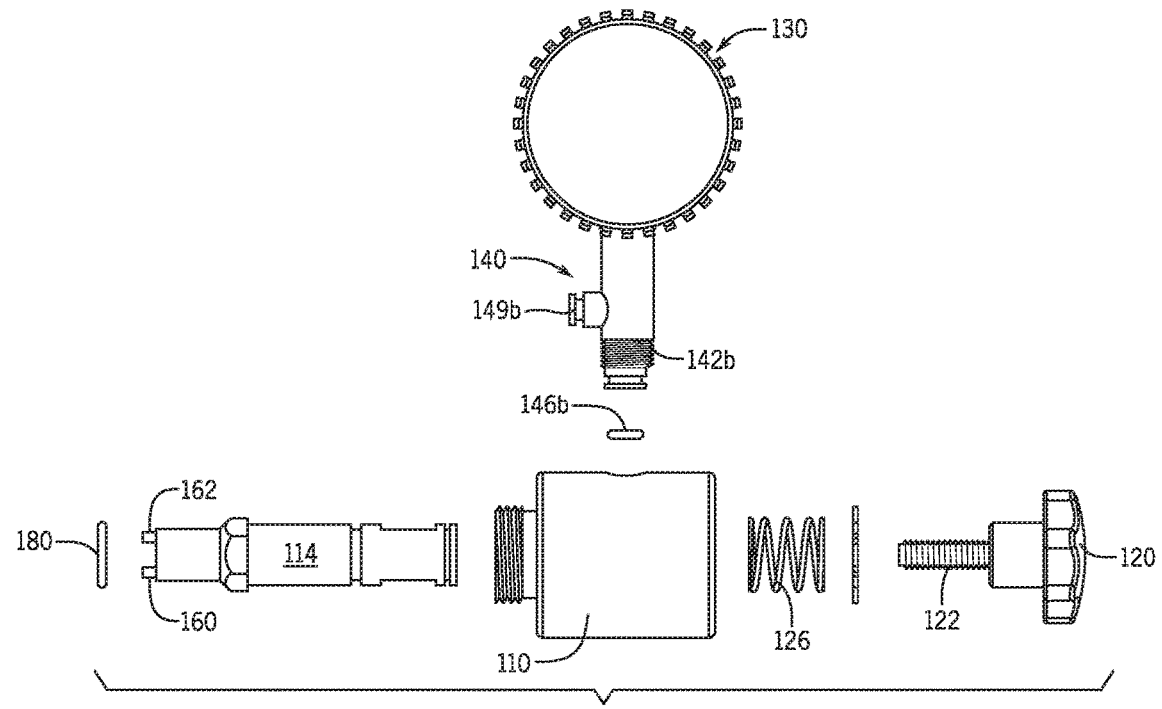
FIG. 3B is an exploded view of another embodiment of the remote regulator adjustment tool 100.

A bore 112 extends therethrough housing 110 and adjustor piston 114 is movably disposed within bore 112. Further, adjustor piston 114 is formed to include a threaded aperture extending inwardly from a proximal end thereof and an adjustment knob 120 is attached to a distal end of threaded shaft 122 (FIGS. 3A and 3B). Threaded shaft 122 (FIG. 3A) meshes with a threaded aperture 115 (FIGS. 2B and 3A) formed within the adjustor piston. Alignment keys 160 and 162 (FIGS. 1A, 1B, 3A, and 3B) are disposed on distal end of adjustor piston 114.

Figure 2C:
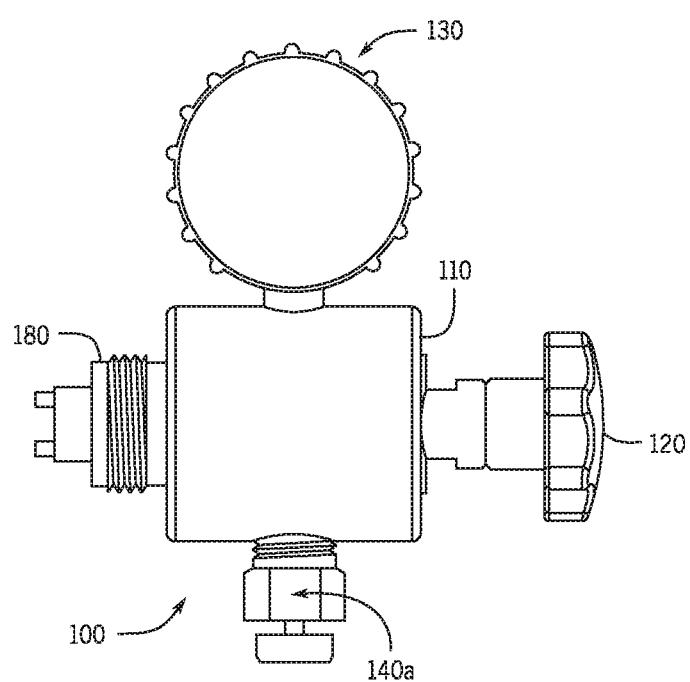
FIG. 2C illustrates one embodiment of the disposition of a pressure relief assembly 140.
Figure 2D:
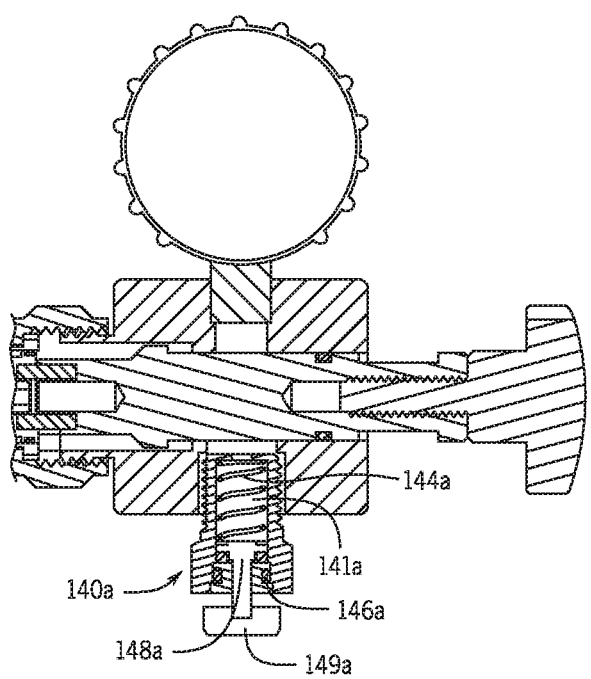
FIG. 2D is a cross-sectional view illustrating components comprising the embodiment of the remote regulator adjustment tool 100 in FIG. 2C.

In certain embodiments, the pressure relief assembly 140 is located on an opposite side of the pressure gauge 130 (FIGS. 2C, 2D and 3A). In other embodiments, the pressure relief assembly 140 is located on the same side of the pressure gauge 130 (FIGS. 1A, 1B, 2B and 3B). Now, referring to FIG. 2D, the pressure relief assembly 140a, located on the opposite side of the pressure gauge 130, comprises a housing 141a formed to include a threaded end and a bore 142a (FIG. 3A) therethrough. Gasket 146a is disposed over a distal err of bore 142a. Push rod 148a extends though gasket 146a, and physically contacts a spring 144a. Button 149a is attached to push rod 148a. Pushing button 149a releases pressure within the remote regulator adjustment tool. Pressure gauge 130 measures pressure when the remote regulator adjustment tool alone, or when the remote regulator adjustment tool in combination with Applicants' remote regulator is connected to a source of pressurized gas.

Further, referring to FIG. 3B, the pressure relief assembly 140, located on the same side of the pressure gauge 130, comprises a housing 141b (FIG. 1B) formed to include a threaded end and a bore 142b (FIG. 3B) therethrough. Gasket 146b is disposed over a distal end of bore 142b. Pushing button 149b releases pressure within the remote regulator adjustment tool.

Figure 5A:
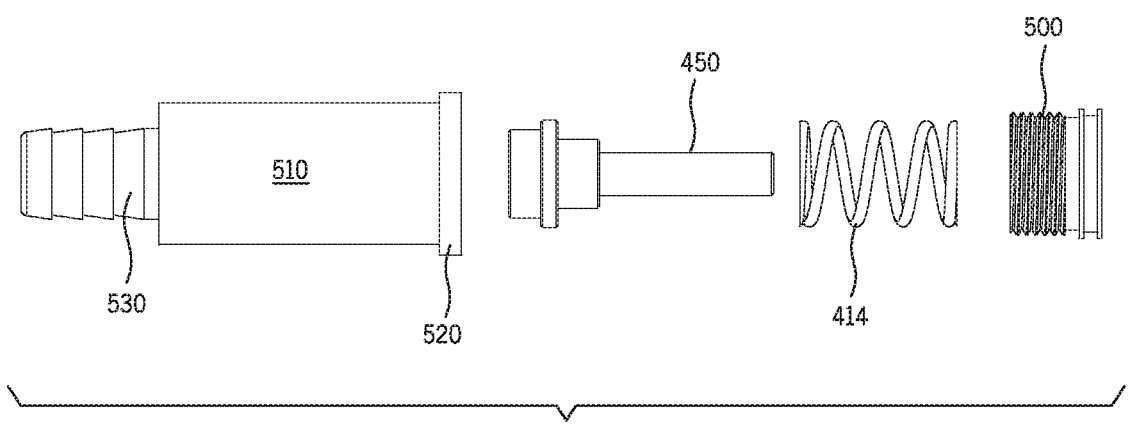
FIG. 5A is an exploded view of the remote regulator 200.
Figure 5B:
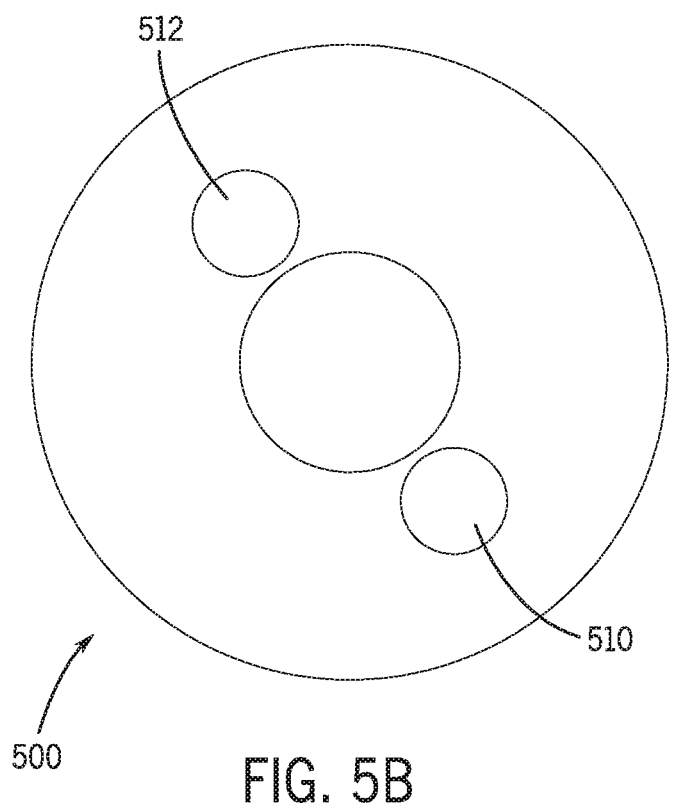
FIG. 5B illustrates a top view of a adjustor cap 500 of the remote regulator 200.
Figure 5C:
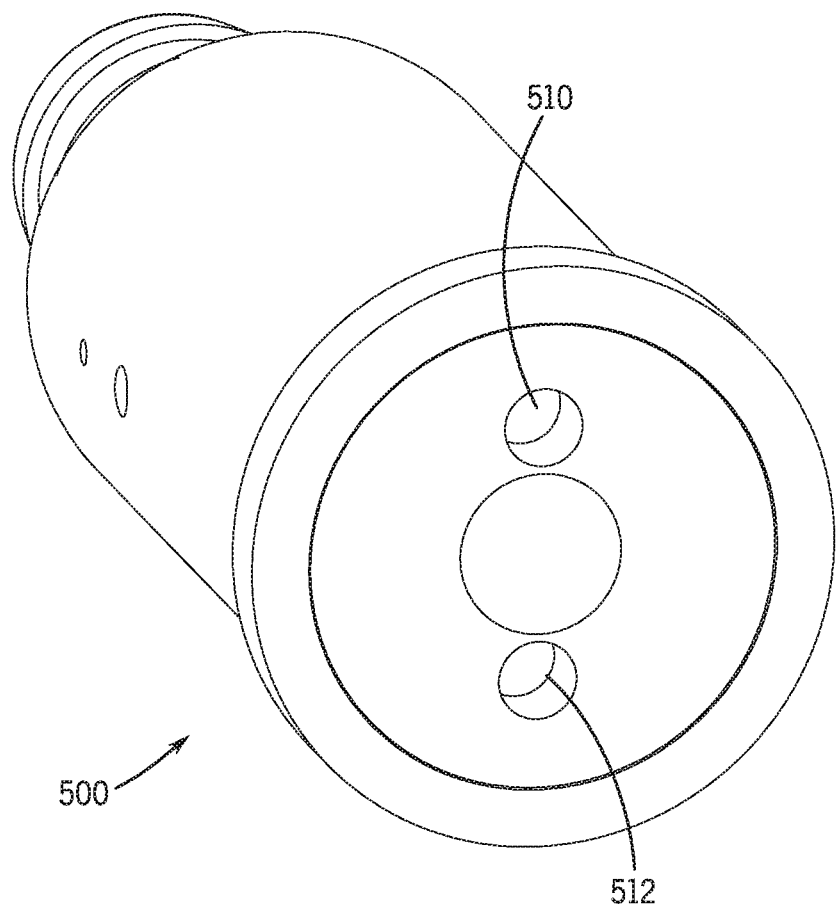
FIG. 5C is a top view of the adjustor cap 500.

Referring now to FIGS. 5A, 5B, and 5C, Applicants' remote regulator 200 comprises an adjustor cap 500, which is formed to include key slots 510 and 512. Further, key slots 510 and 512 are configured so that alignment keys 160 and 162 (FIGS. 1A and 1B) can be removeably inserted therein. In the illustrated embodiment of FIG. 2B, when remote regulator 200 is releaseably attached to remote regulator adjustment tool 100, alignment keys 160 and 162 are removeably inserted into key slots 510 and 512. After the alignment keys are disposed in the key slots, the pour pressure can be adjusted by rotating the adjustment knob 120. Rather, a distal end of threaded shaft 122 (FIGS. 3A and 3B) is attached to motor 1120. Assembly 1100 further comprises controller 1200. Controller 1200 operates motor 1120.

After adjusting the pour pressure, buttons 149a and 149b can be depressed to release the pressure within adjustment tool 100. After closing the pressure relief assemblies 140 and 140a by allowing button 149a and 149b to return to its initial configuration, the adjusted pressure can be read from pressure gauge 130. If the adjusted pressure differs from a desired pressure, adjustment knob 120 can be rotated clockwise or counter clock-wise in small increments until the desired pour pressure is reached. In certain embodiments, rotating the adjustment knob 120 in small increments allows finite and gradual adjustment of the desired pour pressure. This feature is suitable for pouring many different beverages, which have different desired pour pressures. For example, an ideal range of pour pressure for wine is about 4 to 5 psi; an ideal range of pour pressure for beer is about 10-15 psi; an ideal range of pour pressure for beer (low draw) is about 20 to 25 psi; and an ideal range of pour pressure for nitro is about 30 to 35 psi. The examples are not limiting and a user is able to rotate the adjustment knob 120 to reach any desired pour pressure.

Figure 11:
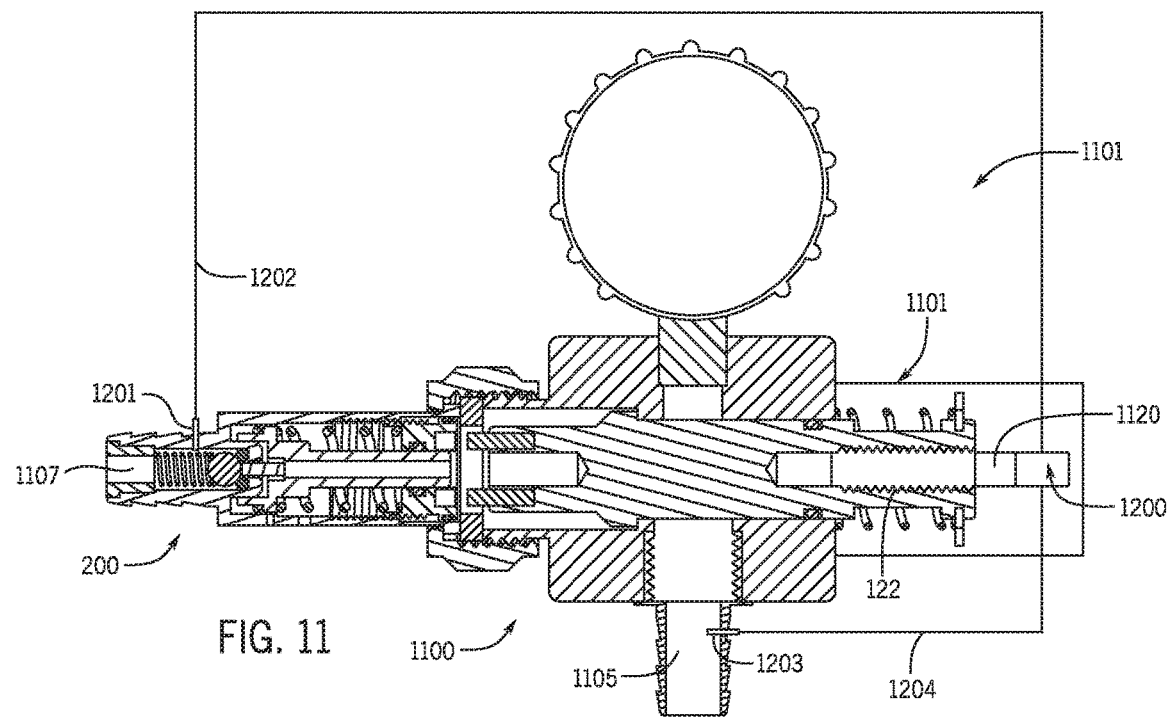
FIG. 11 illustrates Applicants' remote regulator in combination with Applicants' adjustment tool comprising an integral controller 1200.

Referring now to FIG. 11, assembly 1100 comprises regulator 200 in combination with a modified adjustment tool 1101. Adjustment tool 1100 differs from adjustment tool 100 in that pressure relief assembly 140 is replaced by output portion 1105. Pressurized gas from a primary regulator enters assembly 1100 at input end 1107. That one-time reduced-pressure gas first travels through regulator 200, where gas pressure is again reduced.

Assembly 1100 further comprises a housing 1110. Assembly 1101 does not comprise adjustment knob 120 (FIGS. 3A and 3B). Rather, a distal end of threaded shaft 122 is attached to motor 1120. Assembly 1100 further comprises controller 1200. Controller 1200 operates motor 1120.

When motor 1120 causes threaded shaft 122 to rotate in a first direction, the adjustment spring 414 (FIGS. 2A and 4B) in the attached regulator 200 is compressed, and the output pressure in output portion 1105 of assembly 1100 increases. When motor 1120 causes threaded shaft 122 to rotate in a second and opposite direction, the adjustment spring 414 (FIGS. 2A and 4B) in the attached regulator 200 is elongated, and the output pressure in output portion 1105 of assembly 1100 decreases.

Assembly 1100 further comprises a first pressure sensor 1201 in input potion 1107. Communication link 1202 interconnects first pressure sensor 1201 and controller 1200.

Assembly 1100 further comprises a second pressure sensor 1203 in output potion 1105. Communication link 1204 interconnects second pressure sensor 1203 and controller 1200.

Figure 12:
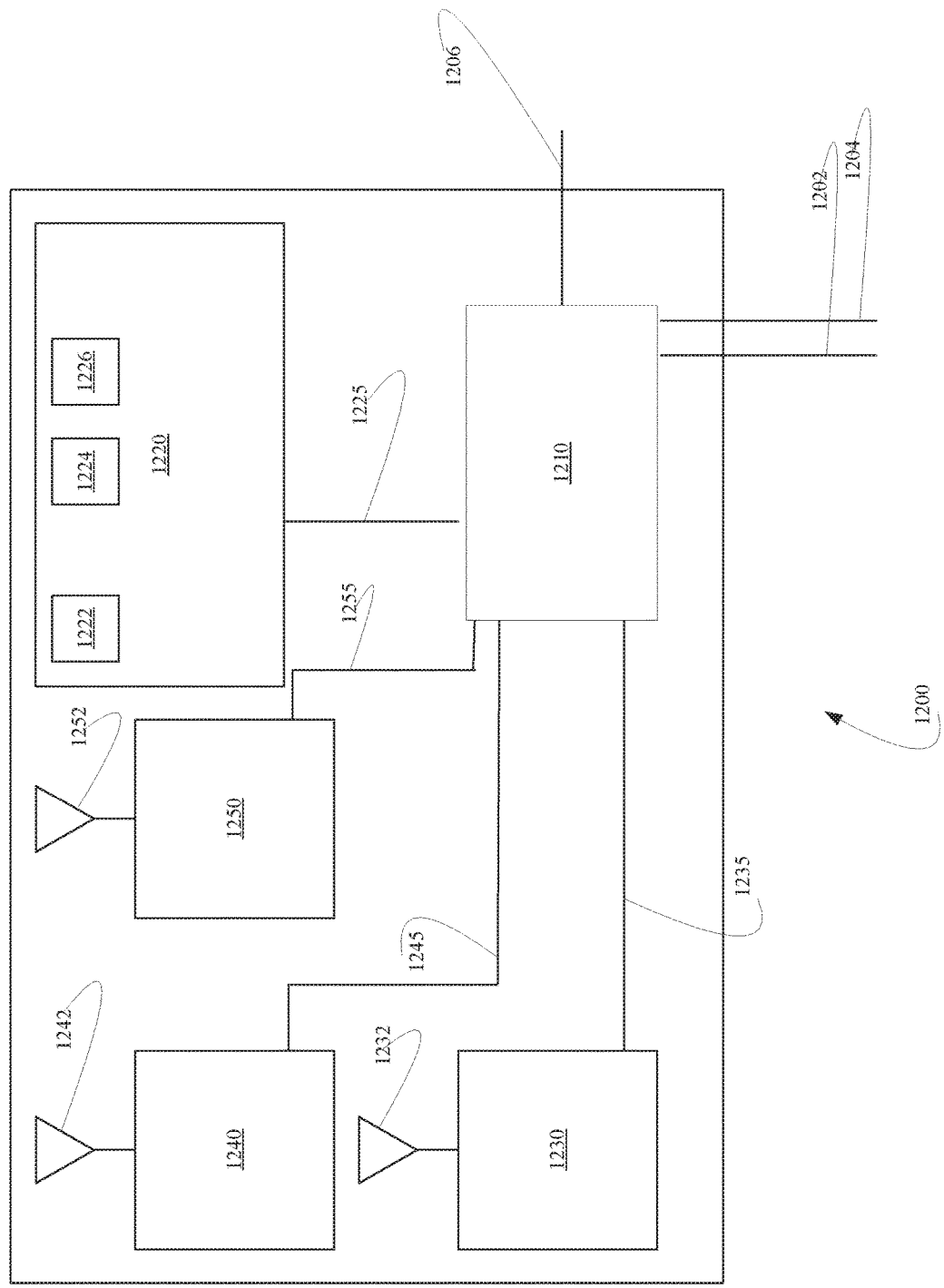
FIG. 12 illustrates controller 1200.

Referring now to FIG. 12, controller 1200 comprises processor 1210, memory 1220 interconnected with processor 1210 via communication link 1225, optional Blue Tooth module 1230 interconnected with processor 1210 via communication link 1235, optional RFID module 1240 interconnected with processor 1210 via communication link 1245, and optional "WI-FI" module 1250 interconnected with processor 1210 via communication link 1255.

In the illustrated embodiment of FIG. 12, microcode 1222, instructions 1224, and database 1226, are encoded in memory 1220. In certain embodiments, memory 1220 comprises non-volatile memory. In certain embodiments, memory 1220 comprises battery backed up RAM, a magnetic hard disk assembly, an optical disk assembly, and/or electronic memory. By "electronic memory," Applicants mean a PROM, EPROM, EEPROM, SMARTMEDIA, FLASHMEDIA, and the like.

Processor 1210 uses microcode 1222 to operate controller 1230. Processor 1210 uses microcode 1222, instructions 1224, and database 1226, to operate Blue Tooth module 1230, RFID module 1240, WI-FI module 1250, motor 1120, and pressure sensors 1201 and 1203.

A desired output pressure in output stage 1105 (FIG. 11) is encoded in database 1226. Controller 1200 continuously monitors the incoming pressure using pressure sensor 1201, and output pressure using sensor 1203. If a measured output pressure is greater than the encoded desired output pressure, then controller 1200 causes motor 1120 to cause threaded shaft 122 to move outwardly, while continuously monitoring the output pressure. If a measured output pressure is less than the encoded desired output pressure, then controller 1200 causes motor 1120 to cause threaded shaft to move inwardly, while continuously monitoring the output pressure. When the measured output pressure equals the desired output pressure, then controller does not cause motor 1110 to rotate threaded shaft 122 in either direction.

Figure 13:
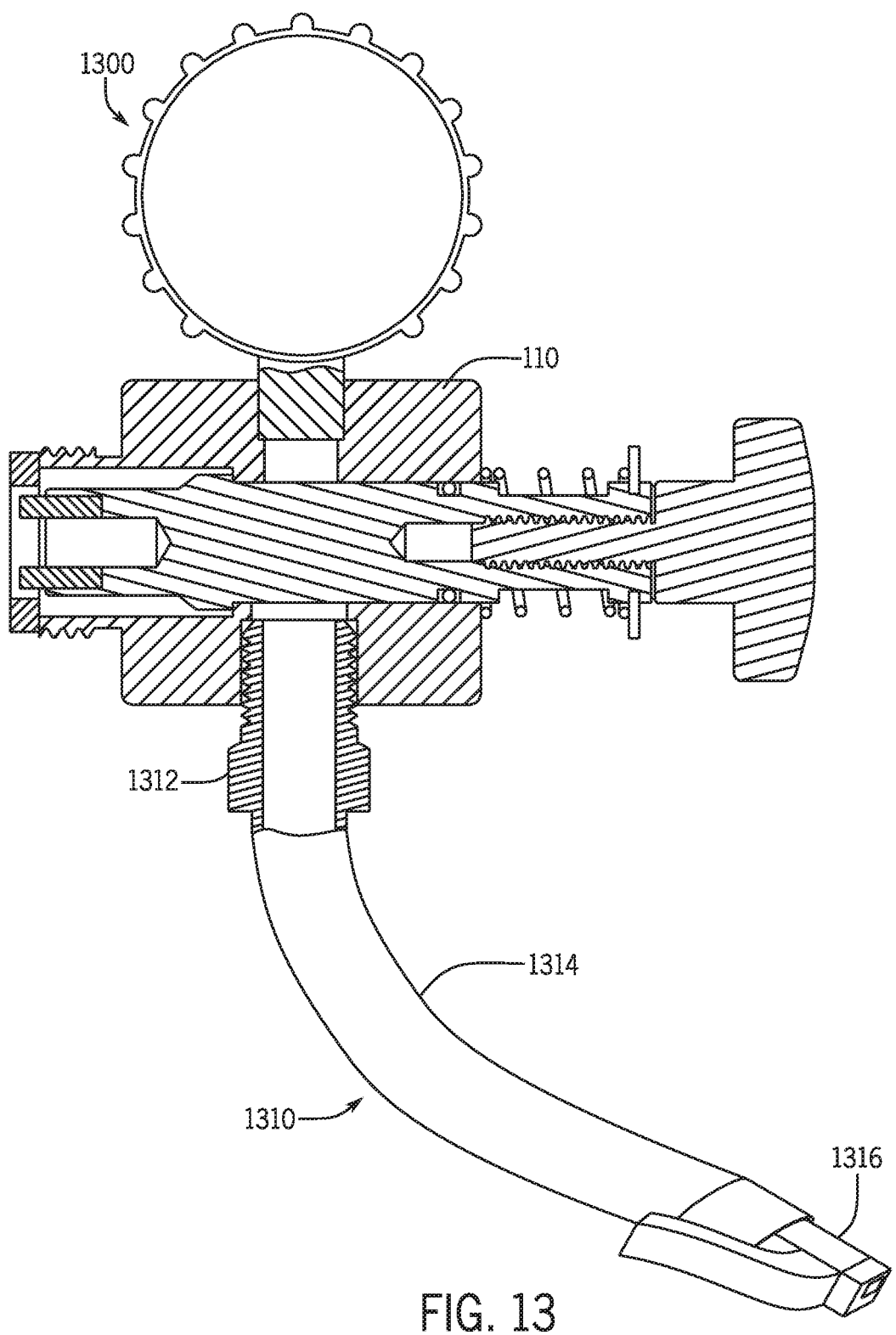
FIG. 13 illustrates Applicants' remote regulator in combination with Applicants' adjustment tool comprising a Schrader valve attachment stage.

Referring now to FIG. 13, assembly 1300 is a modification of adjustment tool 100 (FIG. 2C). In assembly 1300, the pressure relief assembly 140a of adjustment tool 100 is replaced with assembly 1310. Assembly 1310 comprises a threaded coupler 1312 which can be releaseably attached to housing 110 after removing pressure relief assembly 140a. Assembly 1310 further comprises a flexible tube 1314 and a Schrader valve attachment 1316.

By removing pressure relief assembly 140a, and replacing that assembly 140a with an assembly 1310, assembly 1300 can be used as a pressure gauge to check the air pressure within any device comprising a Schrader valve, including without limitation, bicycle tires, automobile tires, and the like.

Figure 14:
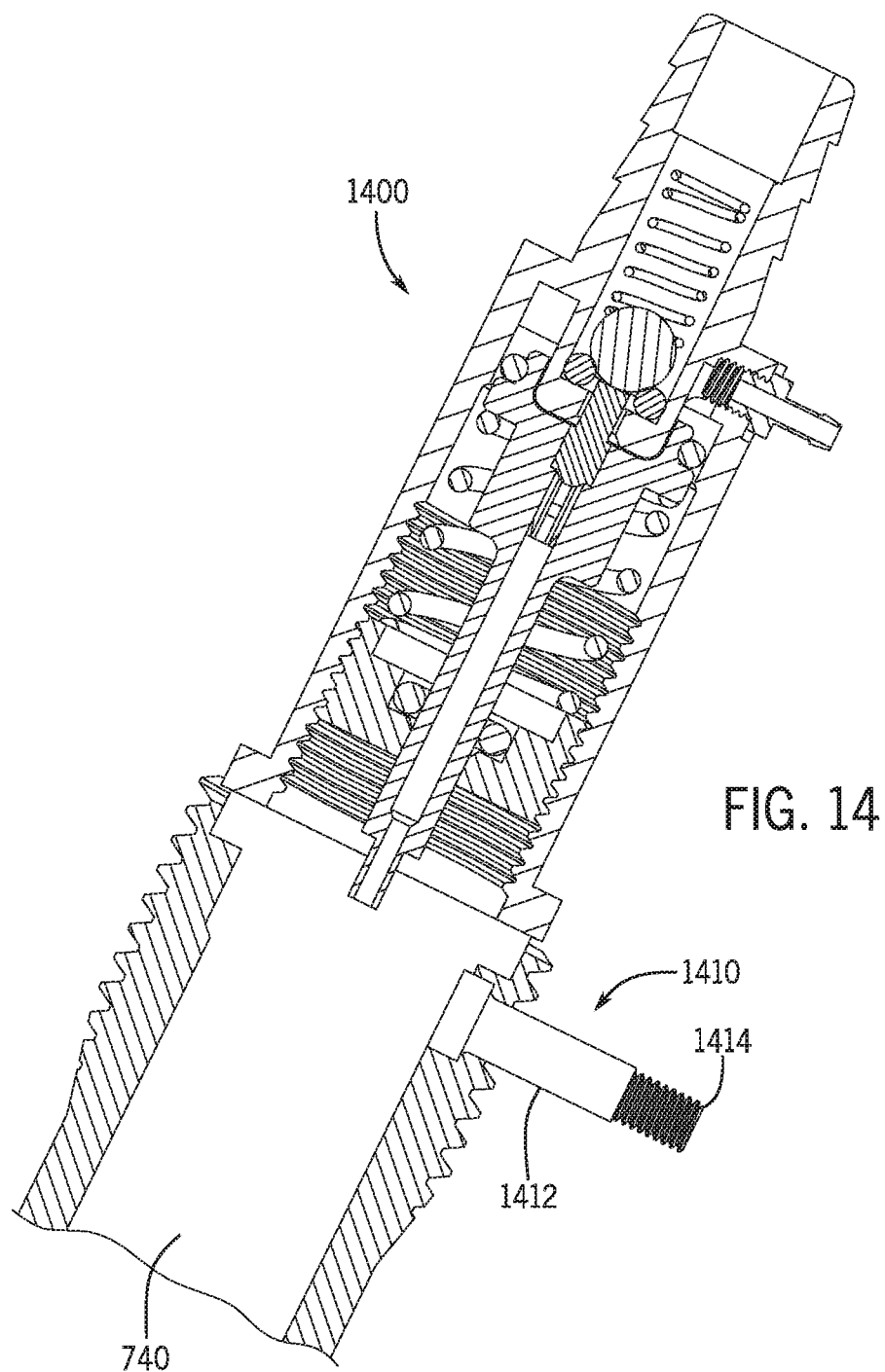
FIG. 14 illustrates Applicants' regulator 1400 which comprises a Schrader valve in fluid communication with a regulator output stage.

Referring now to FIG. 14, regulator 1400 comprises the features of regulator 200 (FIG. 2A) in combination with Schrader valve assembly 1410 which is in fluid communication with low pressure, output stage 740. Assembly 1400 comprises a tubular member 1412 and threaded end 1414. A pressure gauge can be releaseably attached to threaded end 1414 to monitor the pressure within regulator 1400 which regulator 1400 remains in place and in operation.

While the preferred embodiments of the present invention have been illustrated in detail, it should be apparent that modifications and adaptations to those embodiments may occur to one skilled in the art without departing from the scope of the present invention.

We claim:

1. An apparatus for adjusting an output pressure of a workpiece remote pressure regulator, comprising:
    a first housing formed to include a continuous first bore extending therethrough;
    an adjuster piston moveably disposed within said first bore, wherein said adjuster piston comprises a plurality of alignment keys disposed on a distal end thereof, and wherein said adjuster piston is formed to include a threaded aperture extending inwardly from a proximal end thereof;
    a rotatable adjustment knob comprising a threaded shaft extending outwardly therefrom;
    wherein:
    said adjuster piston is attached directly to said rotatable adjustment knob;
    said rotatable adjustment knob is rotatable in a first direction to cause said adjuster piston to rotate and move downwardly in said bore; and;
    said rotatable adjustment knob is rotatable in a second and opposite direction to cause said adjuster piston to rotate and move upwardly in said bore;
    wherein said alignment keys removably engage key slots in the workpiece remote pressure regulator,
    wherein rotation of said rotatable adjustment knob determines the regulated outlet pressure of the workpiece remote pressure regulator; and
    wherein said alignment keys are removable from the key slots in the workpiece remote pressure regulator after the outlet pressure of the workpiece remote pressure regulator has been determined, whereby the workpiece remote pressure regulator maintains that regulated outlet pressure after removal of said alignment keys from the key slots.

2. The apparatus of claim 1, wherein said threaded shaft mates with said threaded aperture.

3. The apparatus of claim 1, further comprising a pressure gauge, wherein said pressure gauge is in fluid communication with said first bore.

4. The apparatus of claim 3, further comprising a pressure relief assembly having a first orientation wherein pressure is maintained within said apparatus and a second orientation wherein pressure is released from said apparatus.

5. The apparatus of claim 4, wherein said pressure relief assembly further comprises:
    a second housing formed to include a threaded end and a second bore therethrough;
    a spring disposed within said second bore;
    a gasket disposed over a distal end of said second bore;
    a push rod extending through said gasket and in physical contact with said spring; and
    a button attached to a distal end of said push rod;
    wherein said button is movable inwardly to release pressure from said apparatus.

6. An apparatus for adjusting an output pressure of a pressure regulator, comprising:
    a first housing formed to include a continuous first bore extending therethrough;
    an adjuster piston moveably disposed within said first bore, wherein said adjuster piston comprises a plurality of alignment keys disposed on a distal end thereof, and wherein said adjuster piston is formed to include a threaded aperture extending inwardly from a proximal end thereof;
    a rotatable adjustment knob comprising a threaded shaft extending outwardly therefrom;

wherein:

said adjuster piston is attached directly to said rotatable adjustment knob;

actuating said knob in a first direction causes said adjuster piston to move downwardly in said bore; and;

actuating said knob in a second and opposite direction causes said adjuster piston to move upwardly in said bore;

a pressure gauge, wherein said pressure gauge is in fluid communication with said first bore;

a pressure relief assembly having a first orientation wherein pressure is maintained within said apparatus and a second orientation wherein pressure is released from said apparatus; wherein said pressure relief assembly further comprises a second housing formed to include a threaded end and a second bore therethrough;

a spring disposed within said second bore;

a gasket disposed over a distal end of said second bore;

a push rod extending through said gasket and in physical contact with said spring; and a button attached to a distal end of said push rod;

wherein said button can be moved inwardly to release pressure from said apparatus.

\* \* \* \* \*